US005986225A

United States Patent [19]

Castonguay et al.

[11] Patent Number: 5,986,225

[45] Date of Patent: Nov. 16, 1999

[54] CIRCUIT BREAKER BELL ALARM ACCESSORY WITH LOCK-OUT

[75] Inventors: Roger N. Castonguay, Terryville; Dean A. Robarge, Southington, both of Conn.

[73] Assignee: General Electric Company, Schenectady, N.Y.

[21] Appl. No.: 08/878,595

[22] Filed: Jun. 19, 1997

[51] Int. Cl.[6] ........ H02H 3/00

[52] U.S. Cl. ........ 200/308; 200/327

[58] Field of Search ........ 200/308, 324, 200/325, 327, 400, 401; 218/154; 335/17

[56] References Cited

U.S. PATENT DOCUMENTS

| | | | |
|---|---|---|---|
| 3,095,489 | 6/1963 | Baird . | |
| 4,167,988 | 9/1979 | Acampora et al. | 185/40 R |
| 4,672,501 | 6/1987 | Bilac et al. | 361/96 |
| 5,140,115 | 8/1992 | Morris | 200/308 |
| 5,502,286 | 3/1996 | Pollman et al. | 200/401 |
| 5,673,786 | 10/1997 | Seymour et al. | 200/308 |
| 5,889,250 | 3/1999 | Castonguay | 218/514 |

OTHER PUBLICATIONS

08/878598 (41PR–7416), Contact Position Indicator for an Industrial–Rated CB, Castonguay, Roger, Jun. 19, 1997 (Filed).

*Primary Examiner*—Renee S. Luebke

*Attorney, Agent, or Firm*—Cantor Colburn LLP; Carl B. Horton

[57] ABSTRACT

An air circuit breaker bell alarm accessory interacts with the circuit breaker contact position indicator to provide local and remote indication of the occurrence of a circuit interruption. A drive pin extending from the bottom of the accessory interacts with a slot on the contact position indicator lever to prevent release of the circuit breaker closing spring until the bell alarm accessory is manually reset.

17 Claims, 5 Drawing Sheets

CIRCUIT BREAKER BELL ALARM ACCESSORY WITH LOCK-OUT

BACKGROUND OF THE INVENTION

Air circuit breakers as described within U.S. Pat. No. 3,095,489 entitled "Manual Charging Means for Stored Energy Closing Mechanisms of Electric Circuit Breakers" and U.S. Pat. No. 3,084,238 entitled "Ratchet Mechanism for Charging a Closing Spring in an Electric Circuit Breaker" include operating mechanisms that are mainly exposed to the environment. Since the air circuit breakers are rated to carry several thousand amperes of current continuously, the exposure to convection cooling air assists in keeping the operating components within reasonable temperature limits.

U.S. patent application Ser. No. 08/878,598 entitled "Contact Position Indicator for an Industrial-Rated Circuit Breaker", filed concurrently herewith, describes the use of a target device to indicate the condition of the circuit breaker contacts as well as an interlock arrangement for preventing false indication thereof.

Various accessory devices are used with such air circuit breakers to provide auxiliary function along with overcurrent protection. One such accessory is the bell alarm accessory that provides local and remote indication as to the occurrence of circuit interruption. U.S. Pat. No. 5,502,286 entitled "Bell Alarm and Lock-Out for High Ampere-Rated Circuit Breakers" describes a bell alarm accessory used with so-called "insulated case" circuit breakers wherein the circuit breaker interrupting components are completely enclosed within an insulating plastic enclosure. This patent describes one such bell alarm accessory that interacts with the circuit breaker operating mechanism to activate the bell alarm upon circuit interruption and to prevent the closing of the circuit breaker contacts until the accessory is manually reset.

It would be beneficial to provide a similar bell alarm with air circuit breakers to indicate the occurrence of a circuit interruption and to prevent the closing of the circuit breaker contacts until the accessory is manually reset.

One purpose of the instant invention is to provide a bell alarm accessory that provides local as well as remote indication of such circuit interruption as well as preventing circuit breaker contact closure until and unless the accessory has become manually reset.

SUMMARY OF THE INVENTION

An air circuit breaker bell alarm accessory interacts with the contact position indicator to provide local and remote indication of the occurrence of a circuit interruption. The signal flag in the form of a pin arranged at the top part of the accessory projects through an opening in the circuit breaker cover to provide visual indication as to the separation of the circuit breaker contacts. A drive pin extending from the bottom of the bell alarm accessory interacts with a slot on the contact position indicator lever to prevent release of the circuit breaker closing spring until the bell alarm accessory is manually reset.

DESCRIPTION OF THE PREFERRED EMBODIMENT

Figure 1:
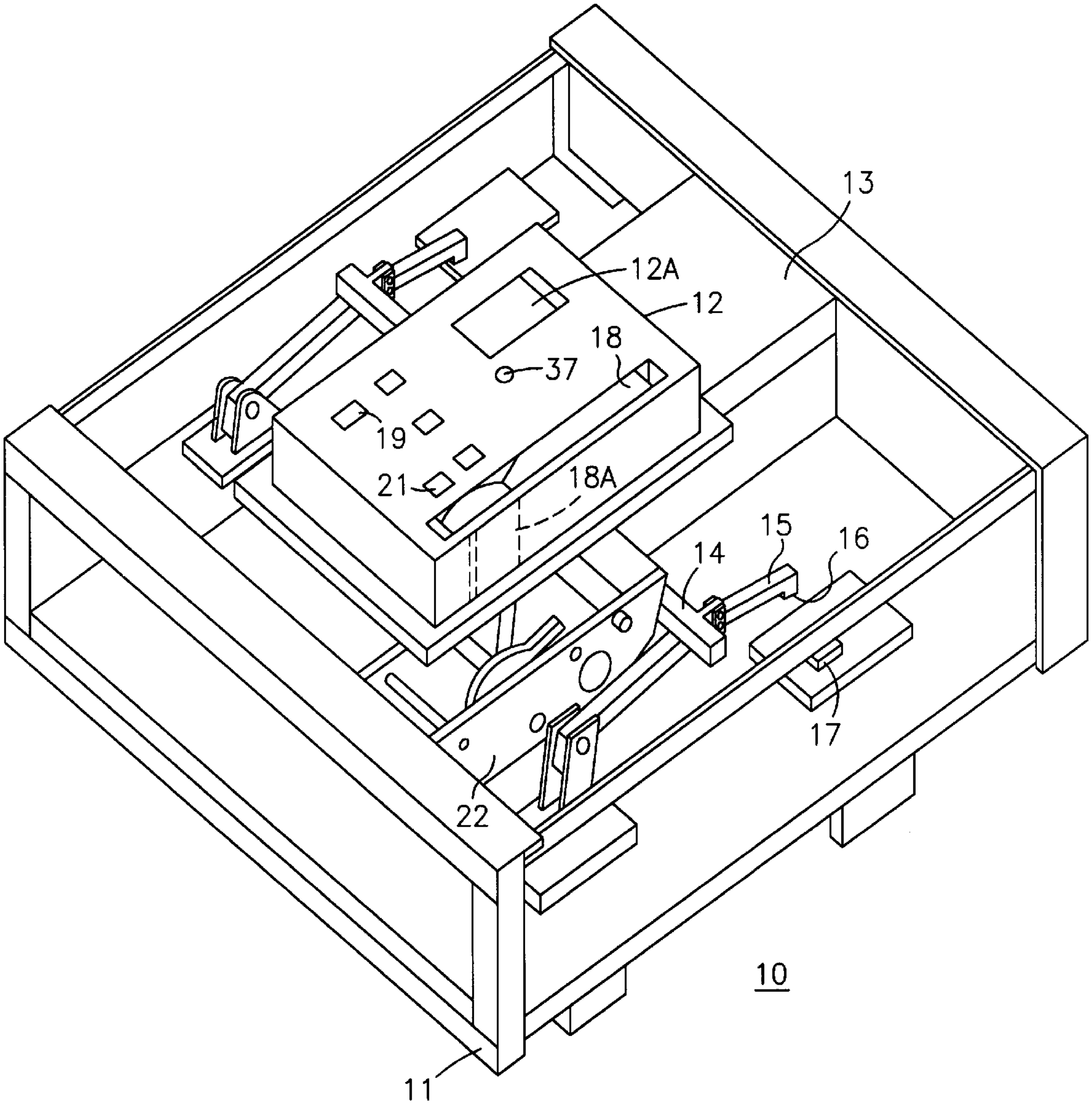
FIG. 1 is top perspective view of an air circuit breaker containing the bell alarm-interlock accessory in accordance with the invention.

The air circuit breaker 10 of FIG. 1 is similar to that described within the aforementioned U.S. Pat. No. 3,095,489 and includes a metal frame 11 which supports the trip unit programmer 12A and the operating mechanism enclosure 13. The trip unit programmer is similar to that described in U.S. Pat. No. 4,672,501 entitled "Circuit Breaker and Protective Relay Unit". The top cover 12 includes a trip button 19 for releasing the circuit breaker operating mechanism contained within the enclosure 13 for separating the circuit breaker contacts 16, 17 to their open condition and a closing button 21 for moving the contacts to their closed position. Visual indication of the contact condition is provided by means of the pop-up target aperture 37 in the manner to be described below. The circuit breaker contact arms 15 within each pole of a three pole circuit arrangement, are interconnected by means of the operating mechanism crossbar 14 to insure that all contacts within the separate poles both open and close in unison. The ratchet mechanism 22 improves over the earlier mechanism described in the aforementioned U.S. Pat. No. 4,167,988 by allowing the operating mechanism closing spring described therein to be charged remotely by means of a motor operator as well as by means of the circuit breaker operating handle 18 that interacts with the ratchet mechanism 22 by means of a pair of plate connectors, one of which is indicated at 18A.

Figure 2:
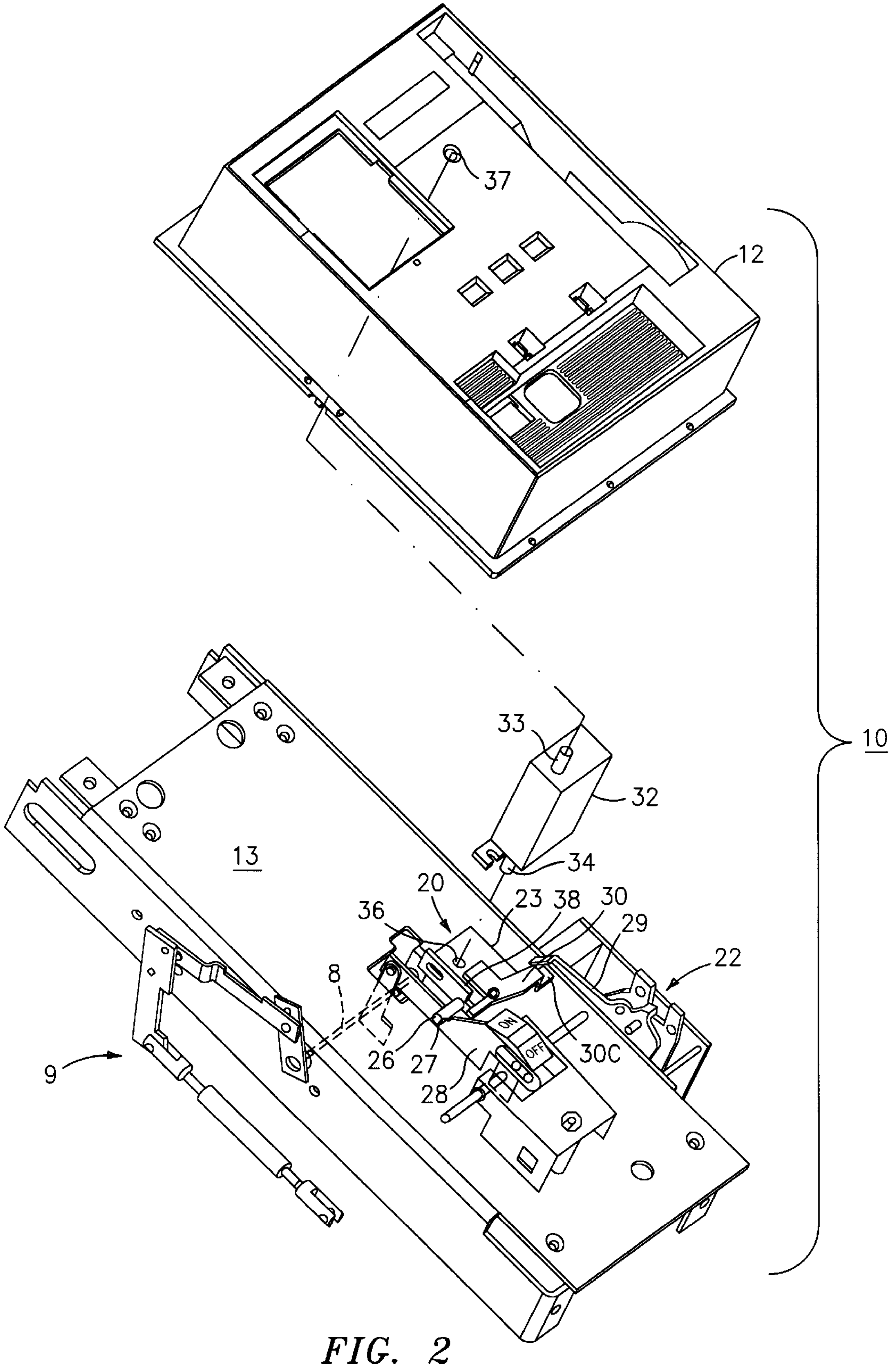
FIG. 2 is a top perspective view of the circuit breaker of FIG. 1 with the circuit breaker cover removed to detail the bell alarm accessory in isometric relation with the trip indication mechanism.

The circuit breaker 10 of FIG. 2, depicted with the circuit breaker cover 12 removed from the circuit breaker operating mechanism enclosure 13, illustrates the contact arm connector assembly 9 arranged on one side of the enclosure 13 and the ratchet assembly 22 on an opposite side thereof. The contact arm connector assembly 9 interacts with indicator drive lever 28 by means of the extended rod 8 to provide accurate indication of the condition of the circuit breaker contacts 16, 17 of FIG. 1 in the manner described in aforementioned U.S. Ser. No. 08/878,598. The bell alarm interlock assembly 20, hereinafter "interlock assembly", interacts with the indicator drive lever 28 by capture of the bell alarm drive pin 26, extending from the interlock slide 38, within the slot 27 formed in the drive lever 28, as illustrated. The interlock assembly support plate 23 carries the T-shaped actuation arm 30 that interacts with the blocking prop 29 by means of the offset tab 30C. The bell alarm module 32, described in the aforementioned U.S. Pat. No. 5,502,286, is positioned on the support plate such that the pop-up target 33, on the top of the module, extends within the aperture 37 formed in the circuit breaker cover 12 and the lock-out plunger 34, on the bottom of the module, extends within the aperture 36 in the support plate 23.

Figure 3:
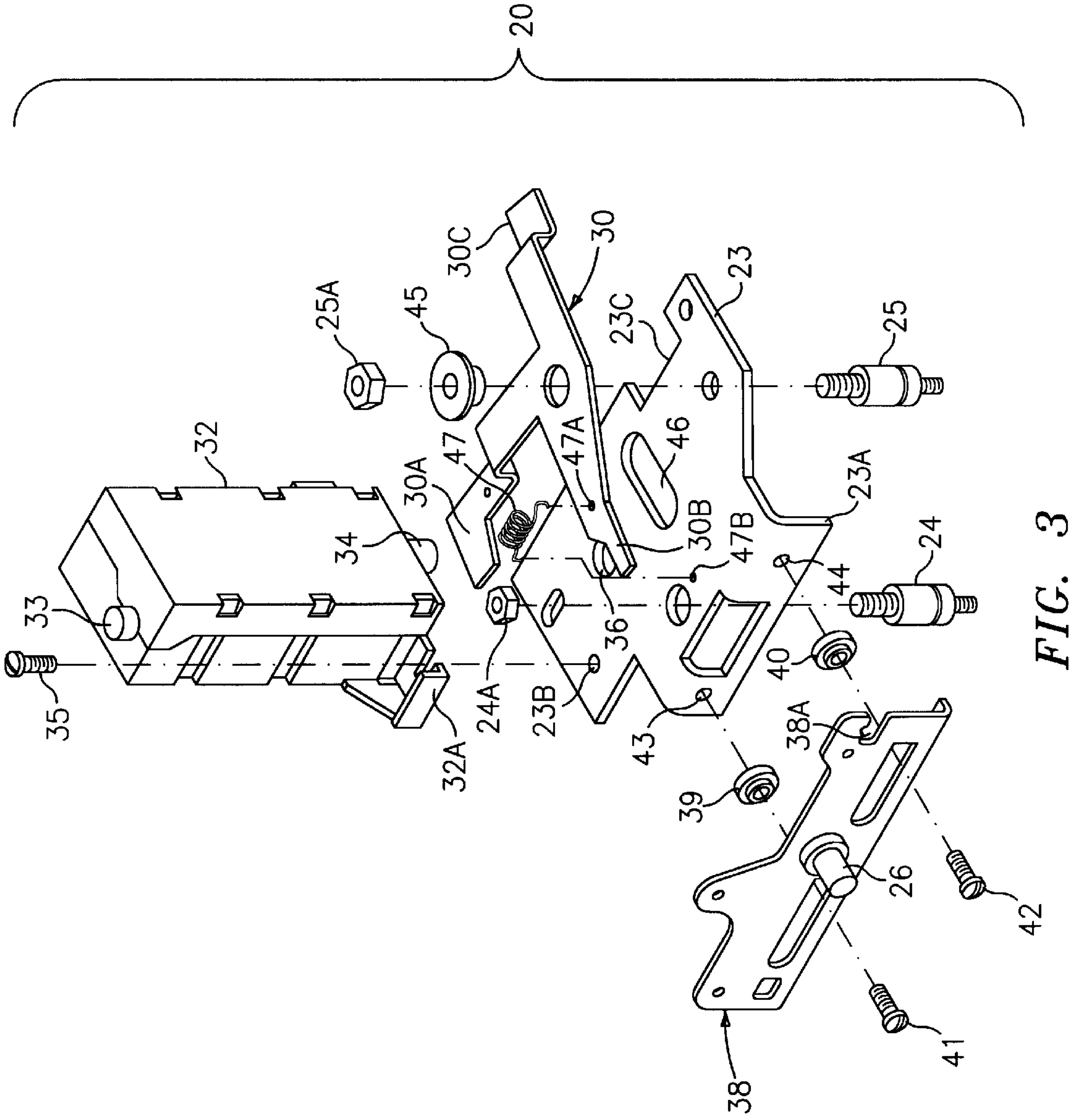
FIG. 3 is an exploded top perspective view of the bell alarm accessory in isometric projection with the components contained within the trip indication mechanism of FIG. 2.
Figure 4:
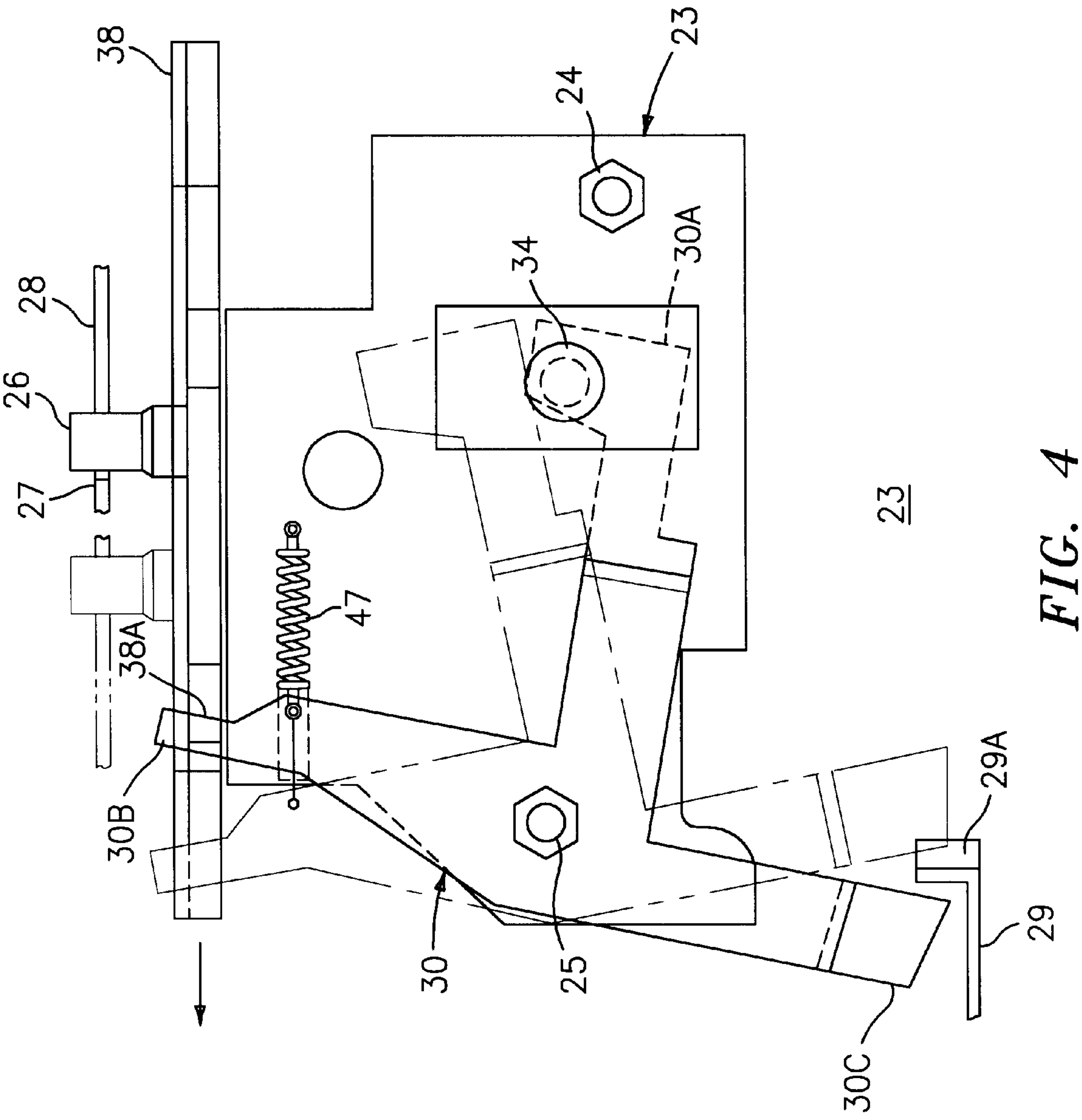
FIG. 4 is a bottom plan view of the trip indication mechanism of FIG. 2.
Figure 5:
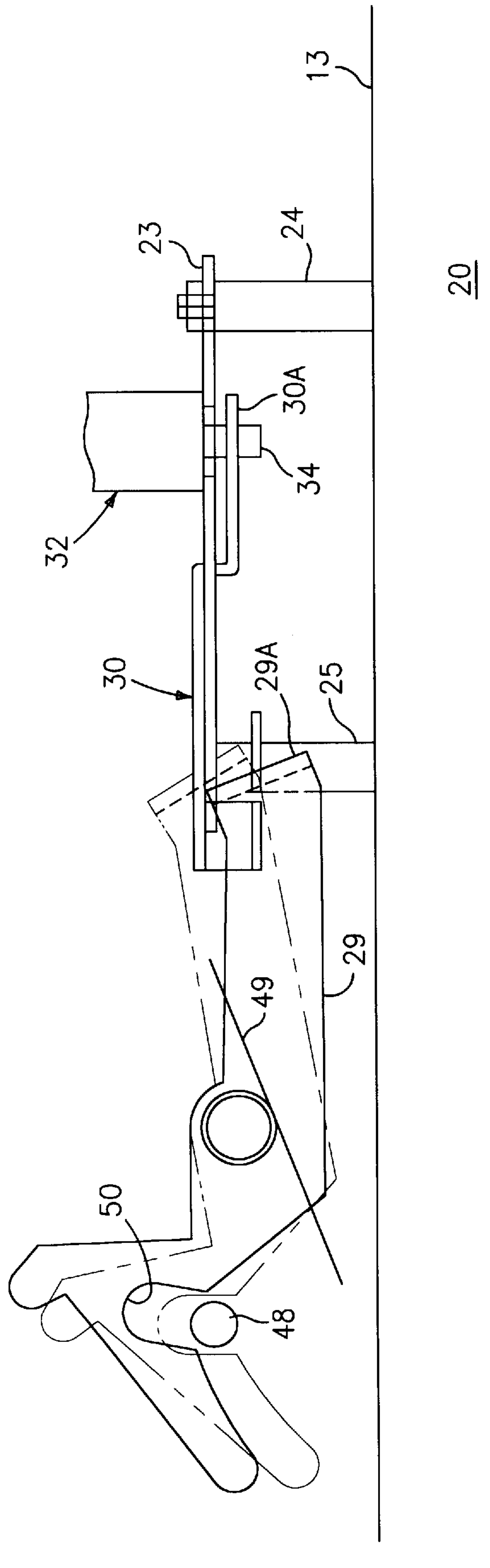
FIG. 5 is a side view of the trip indication mechanism of FIG. 2.

The interlock assembly 20 is shown now in FIG. 3 prior to attaching the support plate 23 and T-shaped actuation arm 30 to the operating mechanism enclosure 13 of FIG. 2 by means of stand-off connectors 24, 25, bushing 45 and nuts 24A, 25A. The interlock slide 38 that carries the drive pin 26 is attached to the bent tab 23A, extending downward from the support plate 23, by means of the screws 41, 42, spacers 39, 40 and threaded openings 43, 44. The T-shaped actuation arm 30 is positioned on the support plate 23 by first passing the off-set end 30A of the T-shaped actuation arm within the slot 46 and arranging the off-set end under the aperture 36 to interact with the lock-out plunger 34 extending from the bottom of the bell alarm module 32 opposite the pop-up target 33 when the bell alarm module is fastened to the support plate 23 by means of the screw 35, slot 32A and threaded opening 23B. The T-shaped actuation arm return spring 47 connects with the aperture 47A on the T-shaped actuation arm 30 at one end and with the aperture 47B on the support plate 23 at the opposite end thereof. The end 30B of the T-shaped actuation arm 30 is inserted within the slot 38A at the end of the interlock slide 38 and the off-set tab 30C of the T-shaped actuation arm is positioned within the elongated slot 23C formed in the edge of the support plate 23 to interact with the tab 29A on the end of the blocking prop 29 in the manner best seen by now referring to the interlock assembly 20 as depicted in FIGS. 4 and 5 wherein the standoff connectors 24, 25 on the support plate 23 are included as points of reference relative to the circuit breaker operating mechanism enclosure 13.

With the circuit breaker contacts 16, 17 of FIG. 1 in the OPEN condition, the interlock assembly components are indicated in solid lines and with the circuit breaker contacts in the CLOSED condition, the same components are indicated in phantom. As the contacts move from the OPEN to CLOSED positions as so indicated, the drive pin 26, carried by the interlock slide 38 drives the indicator drive lever 28 in the same direction by engagement within the drive lever slot 27 thereby moving the end 30B of the T-shaped actuation arm 30 in the same direction by capture of the end thereof in the slot 38A within the interlock slide 38 and rotating the T-shaped actuation arm in the counterclockwise direction against the bias of the extended return spring 47. The off-set tab 30C of the T-shaped actuation arm 30 is rotated into abutment with the tab 29A on the end of the blocking prop 29. With the blocking prop in this position, as explained in U.S. Pat. No. 5,889,250, entitled "Circuit Breaker Closing Springs Button Interlock Mechanism", filed concurrently herewith, the closing pin 48 is captured within the slot 50 in the blocking prop 29 under the bias provided by the spiral spring 49 to thereby prevent release of the charged circuit breaker closing spring (not shown). At the same time, the off-set end 30A of the T-shaped actuation arm 30 becomes positioned under the lock-out plunger 34 extending from the bottom of the bell alarm module 32 through the aperture 36 within the support plate 23. The bell alarm module 32 is still operational for providing indication of a fault occurrence by release of the pop-up target 33 at the top of the bell alarm module through the aperture 37 formed in the circuit breaker cover 12 shown in FIG. 2, while at the same time releasing the lock-out plunger 34 at the bottom of the bell alarm module as indicated in phantom into the path of the off-set end 30A of the T-shaped actuation arm 30. This now prevents the extended return spring 47 from rotating the T-shaped actuation arm 30 back to the position indicated in solid lines and release the closing pin 48 from the slot 50. It is therefore seen that the bell alarm module 32 is effectively preventing the circuit breaker closing springs from closing the circuit breaker contacts 16, 17 of FIG. 1. To allow the release of the closing pin 48 from the slot 50 on the blocking prop 29, the lock-out plunger 34 on the bottom of the bell alarm module 32 must move away from the off-set end 30A of the T-shaped actuation arm 30. This is accomplished by depressing the pop-up target 33 of the bell alarm module of FIG. 3, in the manner described in the aforementioned U.S. Pat. No. 5,502,286, which releases the lock-out plunger allowing the lock-out plunger to recede within the bottom of the bell alarm module. This allows the T-shaped actuation arm 30 to rotate to the solid position shown in FIG. 5 under the bias of the return spring 47 and release the closing pin 48 and allow the closing spring to respond in the manner described in the aforementioned U.S. Pat. No. 5,889,250, to close the circuit breaker contacts.

We claim:

1. A bell alarm accessory interlock assembly comprising:

a support plate;

an activation member, comprising a pivot and having three arms extending therefrom, pivotally arranged on said support plate; and an ON/OFF indicating slide slidably arranged on said support plate and adapted to engage said activation member and drive said activation member in a first direction when said ON/OFF indicating slide is driven in the first direction to prevent release of a circuit breaker closing spring until a circuit breaker bell alarm accessory is reset.

2. The bell alarm accessory interlock assembly of claim 1 wherein a first of said activation member arms has an engagement tab at one end thereof which moves in the first direction when said indicating slide is driven in the first direction to interact with a circuit breaker blocking prop to prevent release of said blocking prop within a circuit breaker closing spring latching assembly.

3. The bell alarm accessory interlock assembly of claim 2 wherein said first activation member arm is offset at one end to extend beneath said support plate wherein said first activation member arm offset moves underneath said support plate in a first direction when said indicating slide is driven in said first direction to abut said circuit breaker closing spring blocking prop.

4. The bell alarm accessory interlock assembly of claim 2 wherein a second of said activation member arms interacts with said indicating slide and moves in the first direction when said indicating slide is driven in the first direction to indicate whether said circuit breaker contacts are in the open or closed condition.

5. The bell alarm accessory interlock assembly of claim 4 wherein an end of said second activation member arm extends within a slot formed in said indicating slide for moving said second activation member arm in unison with said indicating slide.

6. The bell alarm accessory interlock assembly of claim 4 wherein a third of said activation member arms has an engagement tab at one end thereof which moves in the first direction when said indicating slide is driven in the first direction to interact with a lock-out plunger of said bell alarm accessory to prevent rotation of said activation member when said lock-out plunger is extended.

7. The bell alarm accessory interlock assembly of claim 6 wherein said third activation member arm extends within a slot formed in said support plate and is off-set at one end for further extending beneath said support plate to position the engagement tab of said third activation member arm within an access opening of said support plate to interfere with extended said bell alarm accessory lock-out plunger.

8. The bell alarm accessory interlock assembly of claim 1 wherein said activation member is attached to said support plate by means of an extension spring to bias said activation member to a home position on said support plate when said bell alarm accessory lock-out plunger is reset.

9. A circuit breaker comprising:

a pair of contacts arranged at a first end of a contact arm;

a circuit breaker operating mechanism cross bar for moving said contacts between closed and open conditions;

a circuit breaker cover arranged over an operating mechanism enclosure;

a contact position indicator arranged within said circuit breaker cover and said operating mechanism enclosure, said contact position indicator including an indicating slide interacting with said cross bar;

a closing spring latching assembly arranged within said circuit breaker cover and said operating mechanism enclosure, said closing spring latching mechanism including a holding prop interacting with said cross bar; and a bell alarm accessory interlock assembly, said bell alarm accessory interlock assembly including a support plate, an activation member, comprising a pivot and having three arms extending therefrom, pivotally arranged on said support plate, and an ON/OFF indicating slide slidably arranged on said support plate and adapted to engage said activation member and drive said activation member in a first direction when said ON/OFF indicating slide is driven in the first direction to prevent release of a circuit breaker closing spring until a circuit breaker bell alarm accessory is reset.

10. The circuit breaker of claim 9 wherein a first of said activation member arms interacts with said blocking prop to prevent release of said blocking prop within said circuit breaker closing spring latching assembly.

11. The circuit breaker of claim 10 wherein said first activation member arm is offset at one end to extend beneath said support plate into abutment with said circuit breaker closing spring blocking prop.

12. The circuit breaker of claim 10 wherein a second of said activation member arms interacts with said indicating slide to determine whether said circuit breaker contacts are in the open or closed condition.

13. The circuit breaker of claim 12 wherein an end of said second activation member arm extends within a slot formed in said indicating slide for moving said second activation member arm in unison with said indicating slide.

14. The circuit breaker of claim 12 wherein a third of said activation member arms interacts with a lock-out plunger extending from a bottom of said bell alarm accessory to prevent rotation of said activation member when said lock-out plunger is extended.

15. The circuit breaker of claim 14 wherein said third activation member arm extends within a slot formed in said support plate and is off-set at one end for interference with said bell alarm accessory lock-out plunger.

16. The circuit breaker of claim 14 wherein said bell alarm accessory includes a pop-up target extending from a top of said bell alarm accessory for providing visual indication as to the ON/OFF condition of said circuit breaker contacts.

17. The circuit breaker of claim 9 wherein said activation member is attached to said support plate by means of an extension spring for returning said activation member to a home position after said bell alarm accessory is reset.

* * * * *